United States Patent [19]

Rissanen

[11] Patent Number: 5,450,524
[45] Date of Patent: Sep. 12, 1995

[54] PASSWORD VERIFICATION SYSTEM BASED ON A DIFFERENCE OF SCORES

[75] Inventor: Eugene L. Rissanen, Westerville, Ohio

[73] Assignee: AT&T Corp., Murray Hill, N.J.

[21] Appl. No.: 953,435

[22] Filed: Sep. 29, 1992

[51] Int. Cl.$^6$ ............................................... G10L 7/00
[52] U.S. Cl. ................... 395/2.54; 395/2.52; 395/2.82
[58] Field of Search ............. 395/2, 2.82, 2.6, 2.1, 395/2.54, 2.52; 379/88–91; 381/42, 43

[56] References Cited

U.S. PATENT DOCUMENTS

| | | | |
|---|---|---|---|
| 4,481,384 | 11/1984 | Matthews | 179/18 DA |
| 4,761,807 | 8/1988 | Matthews et al. | 379/89 |
| 4,896,346 | 1/1990 | Belfield et al. | 379/88 |
| 4,910,782 | 3/1990 | Watari | 381/42 |
| 5,054,083 | 10/1991 | Naik et al. | 381/42 |
| 5,125,022 | 6/1992 | Hunt et al. | 379/88 |
| 5,127,043 | 6/1992 | Hunt et al. | 379/88 |
| 5,274,695 | 12/1993 | Green | 379/88 |
| 5,303,299 | 4/1994 | Hunt et al. | 379/88 |

*Primary Examiner*—Allen R. MacDonald
*Assistant Examiner*—Richemond Dorvil
*Attorney, Agent, or Firm*—Dwight A. Marshall; Charles L. Warren

[57] ABSTRACT

Apparatus and method for operating a speech password system. The system apparatus records and stores a plurality of alphanumeric models. A user password is enrolled by the apparatus recognizing spoken sounds and comparing spoken password enrollment sounds with each of the alphanumeric models. Each user password is stored in the system by recording a pair of clusters identifying five alphanumeric models closest to and farther from the user spoken password enrollment sounds of the password. The system identifies subsequent passwords by recognizing a spoken access password and comparing the sounds thereof with each of the cluster identified alphanumeric models and assigning scores representing the similarity of the password access sounds with the alphanumeric models recorded in the pair of clusters. The spoken password access sounds are identified as a previously enrolled password by summarizing the cluster assigned scores and comparing the summation thereof with a predetermined threshold.

10 Claims, 6 Drawing Sheets

FIG. 2

ALPHANUMERIC MODEL FILE 100

| PERSON | PHRASES | | LETTERS | | | NUMERALS | | | | | | | | | |
|---|---|---|---|---|---|---|---|---|---|---|---|---|---|---|---|
| | PASSWD | PHRASE | A | O | W | 0 | 1 | 2 | 3 | 4 | 5 | 6 | 7 | 8 | 9 |
| M1 | 0001 | 0010 | 1010 | 0100 | 0110 | 0011 | 0101 | 1000 | 1110 | 1101 | 1011 | 0000 | 1111 | 0111 | 1001 |
| M2 | 0010 | 1010 | 0001 | 1110 | 1000 | 0100 | 0111 | 1001 | 0011 | 1011 | 1111 | 1100 | 0110 | 0101 | 1101 |
| M3 | 0011 | 0100 | 0000 | 0110 | 0010 | 1000 | 1110 | 1011 | 1101 | 0101 | 0001 | 0111 | 1100 | 1001 | 1111 |
| M4 | 1010 | 1111 | 0110 | 1000 | 0101 | 1101 | 1011 | 0010 | 0100 | 0111 | 1001 | 0011 | 1100 | 1110 | 0001 |
| M5 | 0001 | 1110 | 1101 | 1010 | 1011 | 0110 | 1001 | 0100 | 0010 | 1111 | 0011 | 1100 | 0111 | 0101 | 1000 |
| M6 | 0100 | 1101 | 1000 | 1111 | 0001 | 1011 | 0101 | 1110 | 0111 | 1001 | 1010 | 1100 | 0011 | 0010 | 0110 |
| M7 | 0111 | 0101 | 0100 | 1101 | 1110 | 0001 | 0000 | 1011 | 1001 | 0010 | 1100 | 0010 | 1111 | 1000 | 0011 |
| M8 | 1111 | 1011 | 1000 | 0000 | 0001 | 1010 | 1100 | 0011 | 0101 | 1110 | 0110 | 0010 | 1001 | 0001 | 0111 |
| M9 | 1000 | 1011 | 0101 | 0001 | 0010 | 0000 | 0100 | 0110 | 0010 | 1001 | 1110 | 1111 | 1010 | 0011 | 1100 |
| M10 | 1110 | 1000 | 0100 | 0011 | 0000 | 0010 | 0100 | 1001 | 0111 | 1111 | 0110 | 1101 | 1011 | 1010 | 0101 |
| M11 | 1011 | 0001 | 0100 | 0111 | 0100 | 0100 | 1100 | 1111 | 1101 | 1001 | 0110 | 0101 | 1000 | 0110 | 0011 |
| M12 | 1101 | 0011 | 1110 | 0111 | 0010 | 0110 | 1000 | 1010 | 0101 | 1001 | 1010 | 0010 | 1100 | 0001 | 1111 |
| M13 | 0100 | 0000 | 0111 | 1011 | 0010 | 1110 | 0111 | 0001 | 0101 | 1011 | 1110 | 0000 | 0011 | 1101 | 1001 |
| M14 | 0101 | 0111 | 1010 | 0110 | 0000 | 0010 | 1011 | 1100 | 1000 | 1001 | 0101 | 1111 | 0110 | 1010 | 1000 |
| M15 | 0110 | 1000 | 0001 | 1110 | 0100 | 0001 | 1101 | 0000 | 1001 | 0001 | 1111 | 1111 | 1100 | 1111 | 0111 |
| M16 | 1011 | 0000 | 1011 | 0010 | 1000 | 1111 | 1010 | 0010 | 0101 | 1001 | 0011 | 0001 | 0011 | 1100 | 1101 |
| M17 | 0101 | 0100 | 0110 | 1110 | 1000 | 1011 | 0000 | 1100 | 0011 | 0111 | 1001 | 0111 | 1000 | 0010 | 1111 |
| M18 | 1011 | 0110 | 1101 | 0101 | 0001 | 0001 | 1000 | 1010 | 1111 | 0110 | 1010 | 1100 | 0100 | 1101 | 0010 |
| M19 | 1110 | 0101 | 0000 | 1011 | 0110 | 0001 | 0011 | 0010 | 0111 | 1000 | 1010 | 1101 | 1100 | 1111 | 1001 |
| ...... | | | | | ...... | | | | | ...... | | | | | |
| Mn | 1000 | 1110 | 0011 | 0100 | 1011 | 0010 | 0000 | 1111 | 1001 | 1100 | 0001 | 0111 | 0101 | 1010 | 1101 |

FIG. 3
| USER ENROLLED PASSWORD FILE ||||
|---|---|---|---|
| IDENTITY | PASSWORD | CLUSTER 1 | CLUSTER 2 |
| A4612 | USER PASSWORD 1 | $M_1$ $M_{12}$ $M_n$ $M_5$ $M_{17}$ | $M_3$ $M_{13}$ $M_{16}$ $M_{18}$ $M_4$ |
| BC314 | USER PASSWORD 2 | $M_6$ $M_{14}$ $M_4$ $M_{12}$ $M_3$ | $M_8$ $M_2$ $M_{18}$ $M_n$ $M_9$ |
| ⋮ | ⋮ | ⋮ | ⋮ |
| XC987 | USER PASSWORD n | $M_5$ $M_7$ $M_9$ $M_{13}$ $M_{18}$ | $M_{17}$ $M_{10}$ $M_{15}$ $M_1$ $M_6$ |
FIG. 4
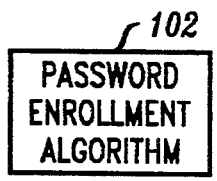
PASSWORD ENROLLMENT ALGORITHM
FIG. 5
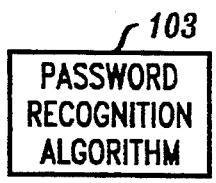
PASSWORD RECOGNITION ALGORITHM

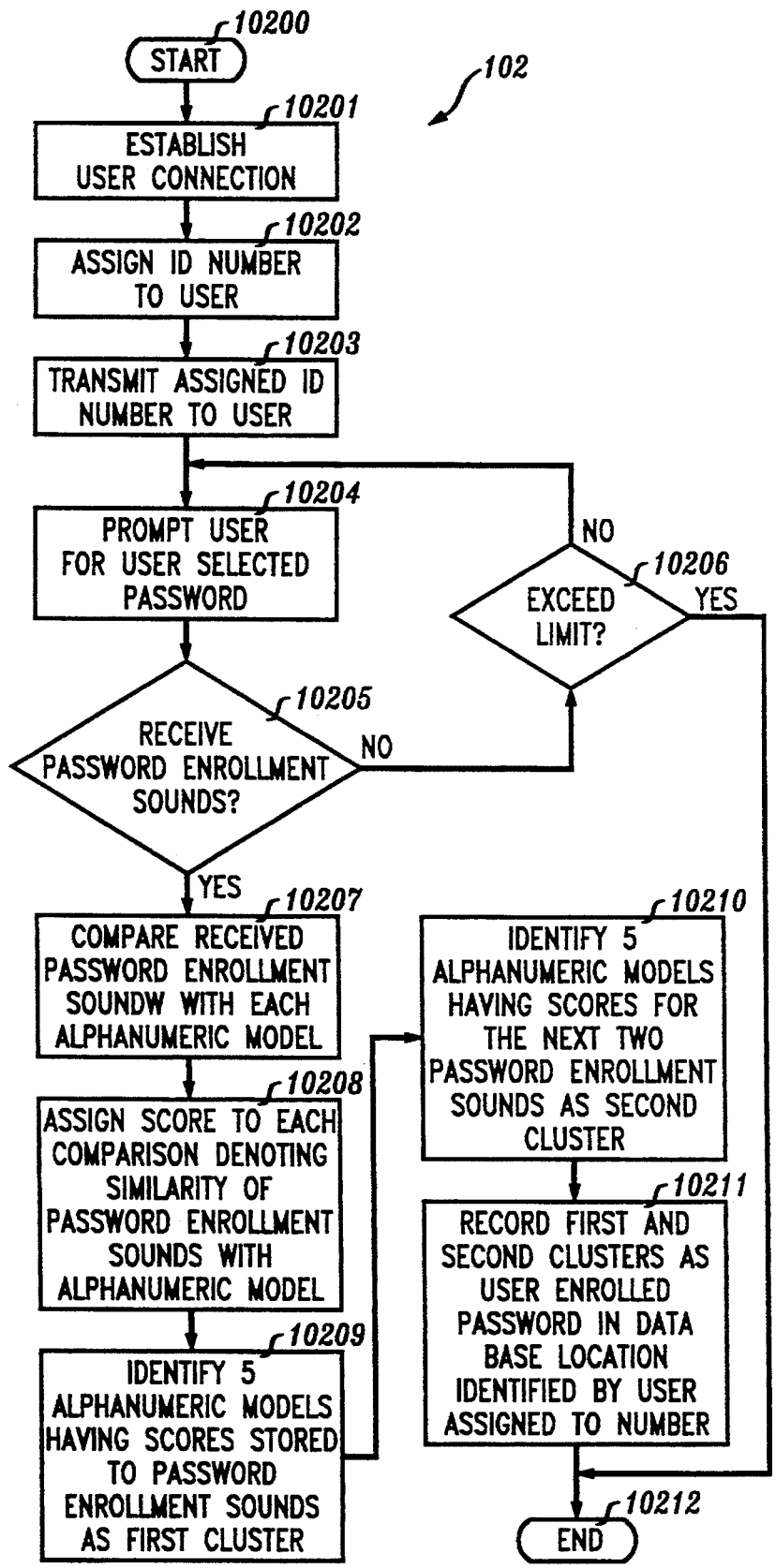

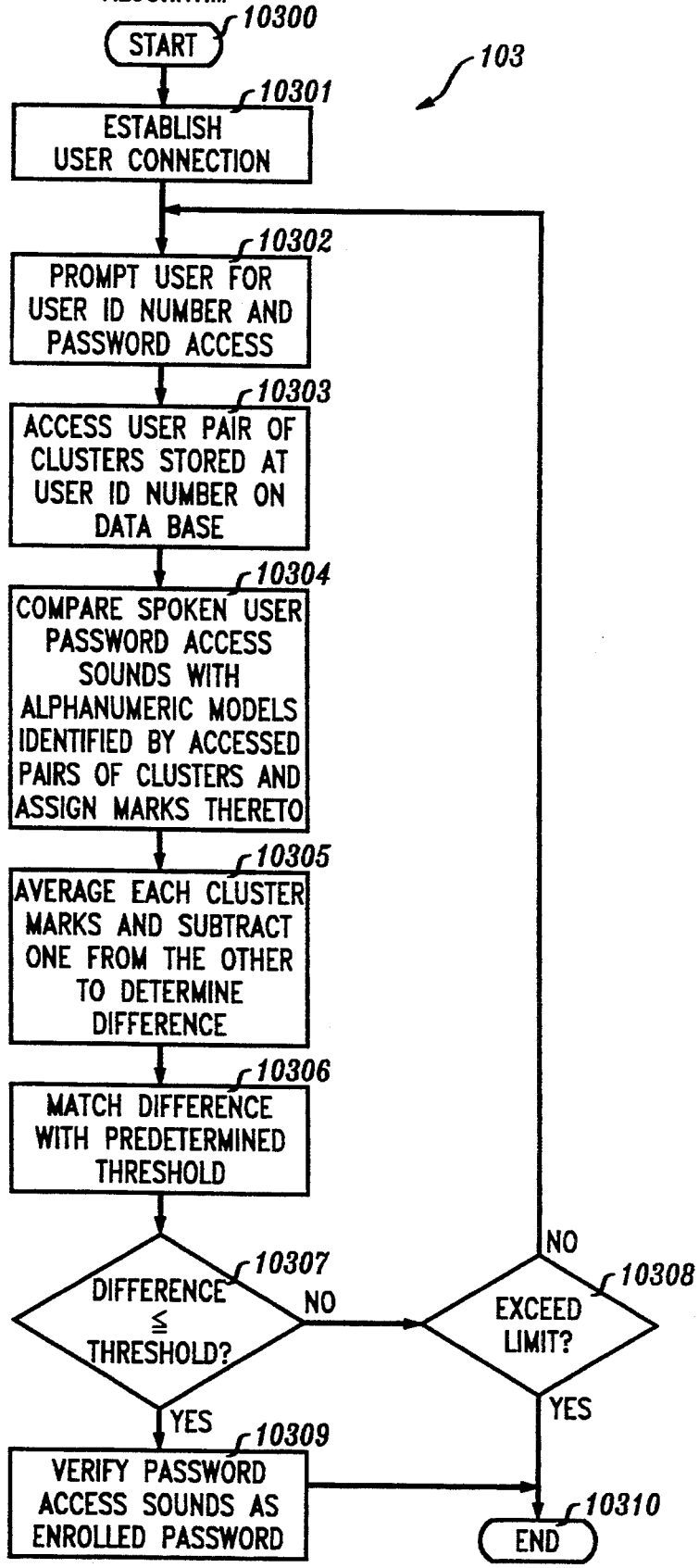

PASSWORD VERIFICATION SYSTEM BASED ON A DIFFERENCE OF SCORES

FIELD OF THE INVENTION

The invention relates to a speech password system and in particular to a system for enrolling a spoken password and for subsequently recognizing a spoken password access word as the enrolled password.

BACKGROUND AND PROBLEM

Computer systems are increasingly being used in the workplace to prepare and store documents of a sensitive nature. In other applications, computer systems are coupled with telephone lines to transmit prompt messages over the telephone network to enable a calling party to access a business system and to instruct the calling party in the use and operation of the accessed business system.

Due to the sensitive nature of business operations, it is often necessary that a user of a computer system and a calling telephone party accessing a computer system over the telephone network be assigned a password intended to enable user access to the computer system. The use of passwords function both to deny access of the computer system to those that are not assigned passwords and to grant access to the password holder.

Business computer systems are arranged to record and store passwords and function to prompt a user of the system for the user's password. Typically, the user enters the password onto a keyboard and the system compares the entered password with previously enrolled passwords and enables the user to access the system when the entered password matches a previously enrolled password.

In voice operated computer systems used both in business and with computer systems coupled with the telephone network, user and calling telephone party passwords are recorded and stored as voice templates in the system data bases. Typically, the computer system prompts the user or calling party to select a password and to enter the selected password by speaking the selected password into input apparatus of the computer system. The system responds to the initial entry of the spoken password by assembling a voice password template which is stored in the system data base. In subsequent use of the system, each user or calling party is prompted to verbally speak the user password. Each entered user spoken password is compared with the previously recorded and stored password templates to determine the validity of the user entered password. When there is a match of the user entered spoken password with a previously recorded password, the system grants access to the user.

A problem arises in present speech password systems in that a considerable amount of data base space is required to store a voice password template and system time required to access each recorded and stored voice password template. The problem is compounded when the computer system is required to record and store a large number of voice password templates for subsequent user and calling party use. Accordingly, a need exists for a computer system arranged to record and store user and calling party voice password information in a format requiring a minimum of system storage and which can compare an entered spoken password with the recorded and stored password information in a minimum of time to provide access to the system.

SUMMARY OF THE INVENTION

The foregoing problem is solved by apparatus of and method for operating a speech password system arranged to enroll and recognize passwords in a minimum of system storage. The apparatus prerecords a predetermined number of spoken alphanumeric models each unique to a person speaking predefined terms, such as phrases, words and numbers. The system recognizes the spoken sounds of an enrollment password and compares the password enrollment sounds with each prerecorded alphanumeric model. Scores representing the similarity of the spoken password enrollment sounds with alphanumeric models are assigned to the compared alphanumeric models. A pair of clusters each identifying five alphanumeric models having scores representing sounds closest to and farthest from the spoken password sounds, respectively, and each separated by a predetermined threshold value are associated with the user and recorded as the user password in system storage. The system recognizes subsequent user spoken password access sounds and compares the spoken password access sounds with the alphanumeric models identified in each user password pair of clusters. Scores representing the similarity of the spoken password access sounds with the closest and farther alphanumeric models recorded in the user password pair of clusters are summarized and subtracted and the difference compared with the predefined threshold to determine if the received password access sounds are the enrolled password.

BRIEF DESCRIPTION OF THE DRAWING

FIG. 2 sets forth an alphanumeric model file of the speech password system apparatus set forth in FIG. 1;

FIG. 3 illustrates a typical user enrolled password file of the speech password apparatus set forth in FIG. 1;

FIGS. 4 and 5 identify password enrollment and recognition algorithms used in the operation of the speech password system set forth in FIG. 1 in accordance with principles of the invention; and FIGS. 6 through 8 illustrate flow charts of the operation of the speech password system set forth in FIG. 1.

DETAILED DESCRIPTION

Figure 1:
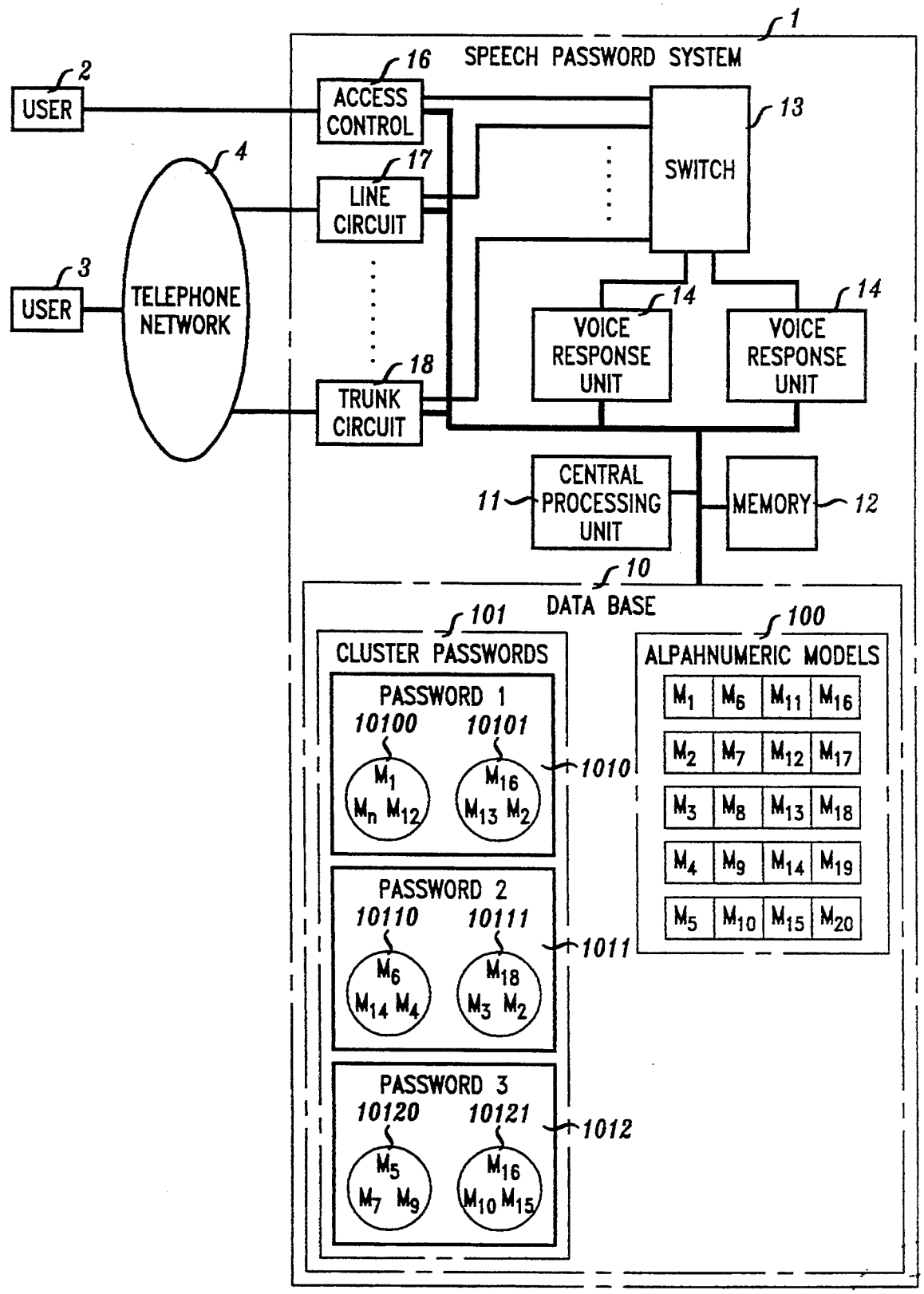
FIG. 1 illustrates a speech password system embodying the principles of the instant invention.

In an exemplary embodiment of the invention, speech password system 1, set forth in FIG. 1 of the drawing, is intended for use in a wide variety of applications to restrict user access to data stored in computer systems and access to physical facilities and services provided to certain users by computer system owners. In one application, a computer system may serve a number of users and store data files each of which, or several of which, may be restricted for use by various users each identified by a password unique to each user. In another application, a company may have a number of physical facilities, such as private telephone lines, which the company may want to restrict access to users who are each given a unique password that enables a user access to the physical facilities. In yet another application, a provider of financial services may provide a user electronic access to user account files wherein access to an account file is governed by a unique password assigned to a user.

Speech password system 1 is intended to enroll user spoken passwords and to recognize subsequent user spoken passwords that correspond with previously enrolled passwords. Speech password system 1 has line interface apparatus comprising a plurality of access control 16, line circuits 17 and trunk circuits 18, each of which are well-known and need not be detailed for an understanding of the invention, and which interconnect speech password system 1 with system users and telephone calling parties such as users 2 and 3. Access control 16 may be connected with any one of a number of well-known voice activated devices that enables user 2 to directly receive from and enter spoken alphanumeric sounds into speech password system 1. Line circuits 17 and trunk circuits 18 may be coupled with corresponding line circuit and trunk circuits of telephone switching systems of telephone network 4 and enable a user 3 of telephone network 4 to place a telephone call to and both enter and receive spoken alphanumeric sounds into and from speech password system 1.

Each speech password system access control, line and trunk circuit 16, 17, 18, respectively, is also coupled to switch 13 and controlled by a data bus extending from central processor unit 11. A number of voice response units 14 are each connected with switch 13 and controlled via central processor unit 11 and the data bus to generate audio prompt messages used to instruct users 2, 3 interconnected with access control, line and trunk circuits 16, 17, 18 in the use of speech password system 1 and to request password information from calling users 2, 3. In addition, each voice response unit 14 is controlled by central processing unit 11 to transmit password information received from users 2, 3 in response to the generated audio prompt messages over the data bus to central processing unit 11. Received password information is recorded under control of central processing unit 11 in data base 10. Switch 13, interconnected with access control, line and trunk circuits 16, 17, 18 and with voice response units 14, is controlled by central processing unit 11, via the data bus to selectively connect voice response units 14 with ones of access control, line and trunk circuits 16, 17, 18 connected with users 2, 3.

Speech password system 1 comprises a general purpose computer, such as a 386, 486 or an AT&T 3B2-400 and 3B2-310 simplex or duplex computer. Such computers need not be described in detail for an understanding of the invention and in general have a central processing unit 11 and a memory unit 12 each interconnected by address, data and control leads to the data bus. The data bus is interconnected with access control 16, line and trunk circuits 17, 18, switch 13 and voice response unit 14 and enables central processing unit 11 to control each unit and to exchange information therewith in the operation of speech password system 1. Central processing unit 11 is programmed to control speech password system 11 to enroll and recognize user spoken passwords. Speech password system 1 records and stores a plurality of alphanumeric models 100 corresponding to strings of predefined spoken alphanumeric terms, such as words, numerals and phrases, entered by persons into speech password system 1 and recorded and stored in data base 10. Typically, 1000 persons each record one alphanumeric model, FIG. 2, of predefined terms from electret and carbon microphones of a telephone. Alphanumeric models may be hidden markov word models and represent at least six representations of each term. Each model has states symbolically represented as binary configurations and are a combination of multivariate Gaussian distributions of a 24 dimensional vector of 12 cepstral coefficients and 12 delta cepstral coefficients.

Data base 10 may be any one of well-known disk, tape, solid state or other type of storage device for storing digital information and is connected to the data bus and controlled by central processing unit 10 to store password information received by speech password system 1. In addition to password information, central processing unit 11 is also programmed to store a number of messages in data base 10 that are used to prompt users 2, 3 in the use of speech password system 1 and to enter password information into the system. Typically, such prompt messages may be "Please speak the password to be enrolled at this time." and "What is your password?".

In operation, a user, such as user 3, FIG. 1, initiates a password request by placing a telephone call over telephone network 4 to speech password system 1. Similarly, user 2 may initiate a request via access control 16. Central processing unit 11 responds to the request received over the system data bus by establishing a connection between the appropriate access control 15, line or trunk circuit 17, 18 through switch 13 to a voice response unit 14. Voice response unit 14 is controlled to transmit a password enrollment prompt message to user 2, 3 and recognizes unique password enrollment sounds spoken by the user in response to the transmitted prompt message. Central processing unit 11 responds to receipt of the user spoken password enrollment sounds by comparing the spoken password enrollment sounds with each of the alphanumeric models 100 stored in data base 10. Scores representing a similarity of the user spoken password enrollment sounds as compared with the alphanumeric models are assigned to each alphanumeric model. The user spoken password enrollment sounds are enrolled as password 1 in data base 10 as a pair of clusters 10100, 10101 wherein each cluster identifies ones of the alphanumeric models stored in alphanumeric model table 100 having assigned scores closest to and farther from the spoken password enrollment sounds, respectively. For example, user 3, may have user password 1, FIG. 3, recorded in cluster file 1010 of user enrolled password file 101 at an identify location A4612 which may be an account number assigned the user. Password 1 is recorded and stored in data base 10 as a pair of clusters 10100, 10101. Cluster 10100, which may be referred to as cluster file 1, stores the identities of five alphanumeric models $M_1$, $M_{12}$, $M_n$, $M_5$ and $M_{17}$ having assigned scores closest to the user spoken password enrollment sounds. Cluster 10101, which may be referred to as cluster file 2, identifies five alphanumeric models $M_3$, $M_{13}$, $M_{16}$, $M_{18}$ and $M_4$ having assigned scores farther from the user spoken password enrollment sounds. The average of the assigned closest to and farther scores are separated by a predetermined threshold. Similarly, another user may have user password 2 recorded in data base 10 at identity location BC314 as clusters 10110, 10111 identifying ones of the alphanumeric models stored in alphanumeric model file 100, FIG. 2, assigned scores closest to and farther from password enrollment sounds spoken by the user. Yet another user password n, FIG. 3, may be recorded in data base 10 at location XC987 as a pair of clusters 10120, 10121.

Speech password system central processing unit 11, FIG. 1, responds to a user request for password access by connecting voice response unit 14 through switch 13 to the appropriate access control 16, line and trunk circuit 17, 18 and transmitting a verbal prompt message to the user requesting a spoken password. Voice response unit 14 and central processing unit 11 respond to password access sounds spoken in response to the transmitted verbal password prompt message by recognizing the received spoken password access sounds and comparing them with each alphanumeric model, FIG. 2, identified by the pair of clusters, FIG. 3, recorded at the user identity location in data base 10. A mark representing an indication of similarity of the recognized user spoken password access sounds with each cluster identified alphanumeric model is assigned the cluster identified alphanumeric model. The marks assigned each as cluster identified alphanumeric model are summarized and the summarization compared with the predetermined threshold to identify the received user spoken password access sounds as an enrolled password. In one embodiment of the invention, one method is to average the marks assigned each cluster identified alphanumeric models and subtract the cluster averaged marks to obtain a difference that is matched with the predetermined threshold. The received user spoken password access sounds are identified as the user password when the difference is less than or equal to the predetermined threshold.

Figure 6:
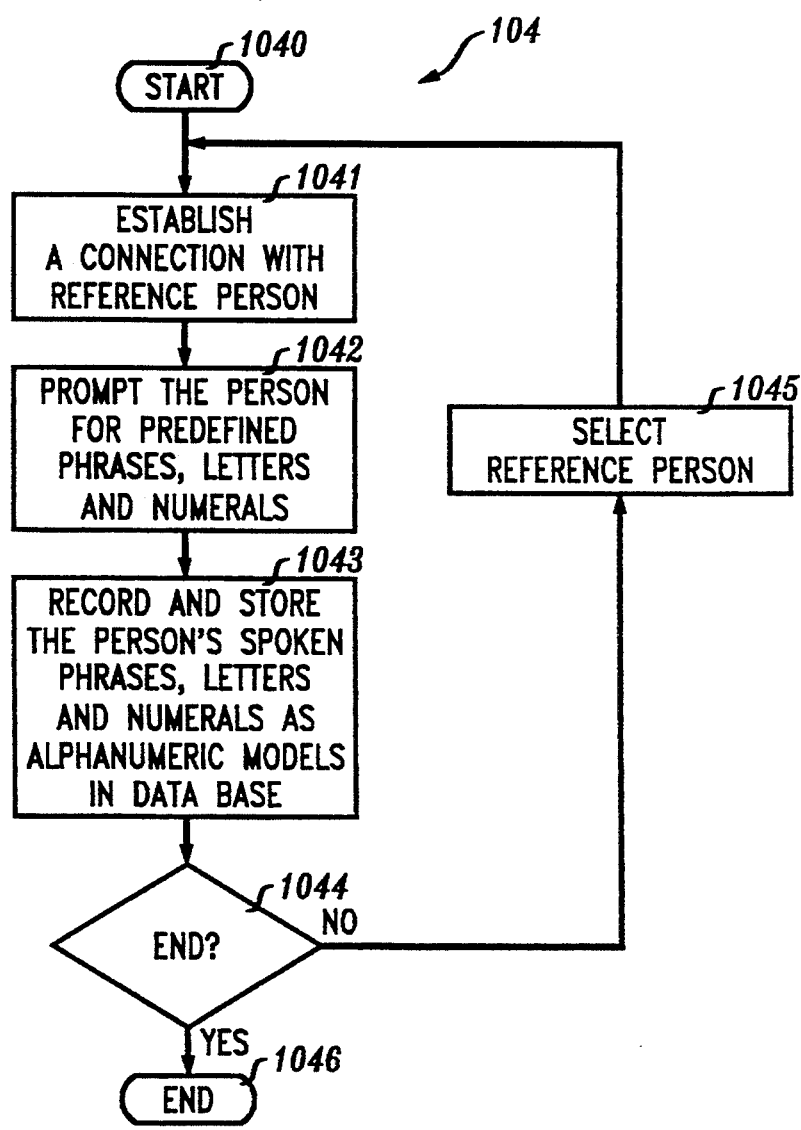

Central processing unit 11, FIG. 1, controls the operation of speech password system 1 in response to programs stored in memory 12, data base 10 and loaded into memory 12. In initial operation, FIG. 6, the enrollment of alphanumeric models start, step 1040, by central processing unit 11, FIG. 1, controlling switch 13 to establish a connection from voice response unit 14 to a reference person, step 1041, FIG. 6. Voice response unit 14 prompts the reference person to speak predefined terms, such as phrases, letters and numerals, step 1042. Typically, although not necessarily limited thereto, the terms, FIG. 2, may be phrases such as "password", "phrase", letters "A, O, W" and numerals "0 through 9". The terms are repeated, recorded and stored in data base 10, represented by digital characters, as an alphanumeric model identified by a reference person, such as reference person M1, step 1043, FIG. 6. A limited number of alphanumeric models are recorded in data base 10 and each identified by the symbolic reference M1 through Mn FIG. 2. If the recording sequence is at an end, step 1044, FIG. 6, the session is terminated, step 1046. If not, the alphanumeric model enrollment is continued, step 1045, by selecting another reference person and repeating steps 1041 through 1044.

Password enrollment algorithm 102, FIG. 4, is initiated, step 10200, FIG. 7, by a user requesting the enrollment of a user selected unique password. Central processing unit 11, FIG. 1, responds to the user password enrollment request, step 10201, FIG. 7, with the requesting user 2, 3, FIG. 1, by establishing a connection between a voice response unit 14 and access control 16, line or trunk circuit 17, 18 via switch 13. A user identification number, for example A4612, FIG. 3, is assigned and transmitted to the user, steps 10202, 10203, FIG. 7. A password prompt message, step 10204, is transmitted to the user to prompt the user for a unique password. In the event speech password system 1 does not receive a response to the prompt message, a determination is made to retransmit the prompt message, steps 10206, 10204. The prompt message may be retransmitted for a predetermined number of times. Should the limit be exceeded, step 10206, password enrollment algorithm 102 is ended, step 10212, and the user is disconnected from the system.

Upon receiving password enrollment sounds from the user, step 10205, central processing unit 11 compares the received password enrollment sounds, step 10207, with each alphanumeric model stored in alphanumeric model file 100, FIG. 2. In the comparison process, step 10208, FIG. 7, a score is assigned to each compared alphanumeric model denoting a similarity of the received user spoken password enrollment sounds with the alphanumeric model. In accordance with an embodiment of the invention, central processing unit 11, operating in accordance with password enrollment algorithm 102, identifies 5 alphanumeric models assigned scores closest to the received password enrollment sounds and records the identities of the alphanumeric models in a first cluster, step 10209. In addition, step 10210, another 5 alphanumeric models having scores farther from the received user spoken password enrollment sounds and separated from the first cluster scores by the predetermined threshold are identified and the identities recorded in a second cluster. The first and second clusters, step 10211, are recorded as the user password in user enrolled password file 101, FIG. 3, in a data base location identified by the user assigned ID number. Speech password system 1 may prompt the user to repeat the password several times during the enrollment sequence. After enrollment of the password, FIG. 7, the password enrollment algorithm 102 is ended, step 10212, and the connection broken with the user.

In the password recognition algorithm 103, FIG. 5, the sequence is started in response to a user request by establishing a connection with the user and prompting the user for the user ID number and password, steps 10300, 10301, 10302, FIG. 8. Upon receipt of the user ID number, step 10303, central processing unit 11, FIG. 1, accesses user pair of clusters stored at the user ID number in data base 10. Assuming receipt of user ID number A4612, FIG. 3, central processing unit 11 accesses user enrolled password file 101 in data base 10 and identifies alphanumeric models $M_1$, $M_{12}$, $M_n$, $M_5$, $M_{17}$ recorded in cluster 10100 and $M_3$, $M_{13}$, $M_{16}$, $M_{18}$, $M_4$ recorded in cluster 10101. The received user spoken password access sounds are compared with each of the alphanumeric models identified by the accessed pair of clusters 10100, 10101 and a mark indicating the similarity of the user password access sounds with the compared alphanumeric model is assigned thereto, step 10304, FIG. 8.

In an embodiment of the invention, the marks of each cluster, such as clusters 10100, 10101, are averaged and subtracted from each other to obtain a difference that is compared with the predetermined threshold, steps 10305, 10306. When it is determined that the difference is equal to or less than the threshold or within a predetermined value thereof, step 10307, the received user spoken password access sounds are verified as the user enrolled password and the user is given access to speech password system 1. When the difference is greater than the threshold or outside the range, step 10307, central processing unit 11 is controlled by password recognition algorithm 103 to repeat steps 10302 through 10307 until the spoken password access sounds are verified as an enrolled password or a predefined limit is exceeded, step 10308, at which time the password recognition algorithm is completed, step 10310.

SUMMARY

It is obvious from the foregoing that the facility, economy and efficiency of speech password systems may be substantially enhanced by a speech password system arranged to record user passwords as a pair of clusters identifying a predetermined number of alphanumeric models both closely resembling and separated from a user spoken password enrollment sounds.

I claim:

1. Apparatus for enrolling and recognizing user spoken passwords comprising means for enrolling a password by comparing spoken sounds of the password with each of a plurality of alphanumeric models;

first means for identifying ones of the alphanumeric models closest to and farther from the spoken password sounds;

second means for identifying spoken password access sounds as an enrolled password by comparing the spoken password access sounds with each identified alphanumeric model;

means for matching scores representing similarity of the spoken password access sounds with the identified alphanumeric models with a predetermined threshold;

said enrolling means recording and storing first and second clusters each having a predetermined number of alphanumeric models having ones of the scores closest to and farther from the spoken password enrollment sounds, respectively, said first means determining a first and second average of the closest and farther scores, respectively;

said matching means comprising means responsive to receipt of user password access sounds for comparing said user password access sounds with said first and second clusters;

means for assigning a mark representing an indication of similarity of the received password access sounds with said first and second clusters;

means for subtracting the mark of the second cluster from the mark of the respective first cluster to obtain a difference thereof;

said matching means verifying the user spoken password access sounds as the user password when said difference is less than a predetermined threshold.

2. The password enrollment and recognizing apparatus set forth in claim 1 further comprising:

a data base for storing a predetermined number of alphanumeric models each recording a person speaking predefined alphanumeric terms.

3. The password enrollment and recognizing apparatus set forth in claim 2 further comprising:

means responsive to a user password enrollment request for transmitting a password enrollment prompt message to the user and for recognizing user password enrollment sounds spoken in response to the transmitted password enrollment prompt message.

4. The password enrollment and recognizing apparatus set forth in claim 1 wherein said second identifying means comprises means responsive to receipt of the user spoken password enrollment sounds for comparing the spoken password enrollment sounds with each alphanumeric model stored in said data base.

5. The password enrollment and recognizing apparatus set forth in claim 1 further comprising:

means responsive to a user request for password access to the password enrollment for transmitting a verbal prompt message to the user requesting a spoken password.

6. Apparatus for enrolling and recognizing user spoken passwords comprising a data base for storing a predetermined number of alphanumeric models each unique to a person and each having recorded the person speaking predefined numerals, words and phrases, means responsive to a password enrollment request generated by a user of the apparatus for transmitting a password enrollment prompt message to the user and for recognizing user password enrollment sounds spoken in response to the transmitted password enrollment prompt message.

means responsive to receipt of the user spoken password enrollment sounds for comparing the spoken password enrollment sounds with each predefined alphanumeric model stored in said data base, means for assigning a score representing a similarity of the spoken password enrollment sounds as compared with each alphanumeric model, means responsive to said assigning means for enrolling the spoken password enrollment sounds as a user password by recording and storing a pair of clusters in said data base wherein each cluster identifies a predetermined number of the alphanumeric models having ones of the scores closest to and farther from the spoken password enrollment sounds, respectively, means responsive to a user request for password access to the password enrolling an recognizing apparatus for transmitting a verbal prompt message to the user requesting a spoken password, means responsive to receipt of user password access sounds spoken in response to the transmitted verbal password prompt message for recognizing the received spoken password access sounds and comparing them with each cluster identified alphanumeric model, means for assigning a mark representing an indication of similarity of the recognized password access sounds with each cluster identified alphanumeric model, means for identifying the received user spoken password access sounds as an enrolled password by averaging the marks assigned each cluster identified alphanumeric models and subtracting the cluster average marks to obtain a difference thereof, and means enabled by said identifying means for matching the difference with a predetermined threshold and identifying the user spoken password access sounds as the user password then the averaged mark difference is within a predefined range of the predetermined threshold.

7. A method of operating apparatus for enrolling and recognizing user spoken passwords comprising the steps of recording and storing a plurality of alphanumeric models corresponding to predefined spoken terms, enrolling a password by comparing user spoken sounds of the password with each alphanumeric model and recording first and second clusters identifying ones of the alphanumeric models closest to and farther from the closest by a predetermined threshold from the spoken password sounds, respectively, generating a score for said first and second clusters, determining a difference between said scores corresponding to the first and second clusters, identifying user spoken password access sounds as an enrolled password by when said difference is within a predetermined threshold.

8. The method of operating the password enrolling and recognizing apparatus set forth in claim 7 further comprising the step of:

transmitting a password enrollment prompt message to the user in response to a user password enrollment request and recognizing user password enrollment sounds spoken in response to the transmitted password enrollment prompt message.

9. The method of operating the password enrolling and recognizing apparatus set forth in claim 7 wherein said enrolling step comprises the steps of:

recording and storing said first and second clusters wherein each identifies a predetermined number of alphanumeric models having ones of the scores closest to and farther from the spoken password enrollment sounds in a data base.

10. The method of operating the password enrolling and recognizing apparatus set forth in claim 7 further comprising the step of:

transmitting a prompt message to the user in response to a user request for access.

* * * * *